Feb. 14, 1933.  F. A. BULLINGTON  1,897,233
MULTIPLE IGNITION CYLINDER HEAD
Filed Feb. 12, 1927
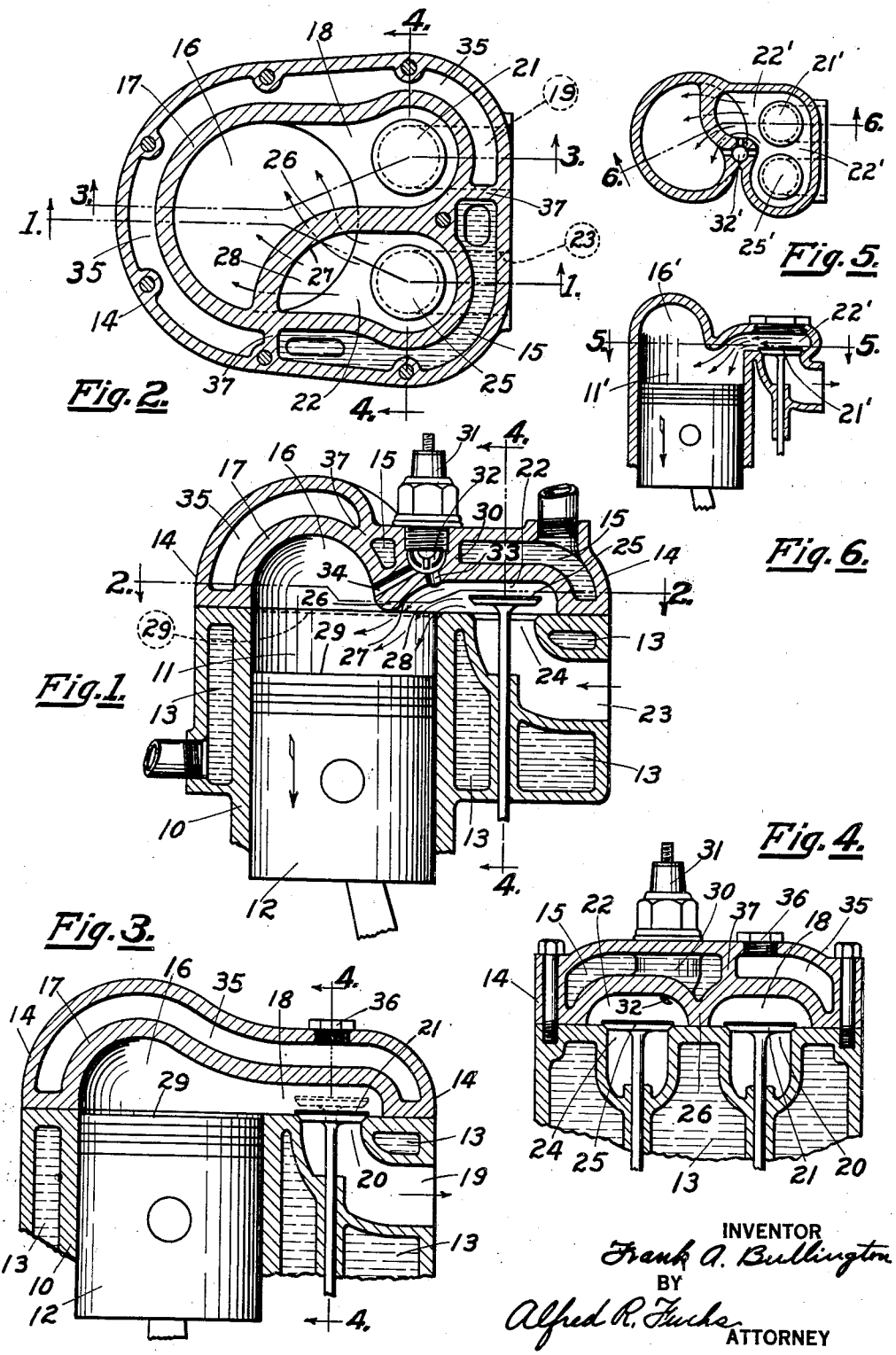

Patented Feb. 14, 1933

1,897,233

UNITED STATES PATENT OFFICE

FRANK A. BULLINGTON, OF KANSAS CITY, MISSOURI, ASSIGNOR TO BULLINGTON ENGINE HEADS, OF KANSAS CITY, MISSOURI, A COMMON LAW TRUST CONSISTING OF LOUIS R. ASH, HOWARD P. TREADWAY, AND FRANK A. BULLINGTON

MULTIPLE IGNITION CYLINDER HEAD

Application filed February 12, 1927. Serial No. 167,756.

My invention relates to internal combustion engines, and more particularly to improved fuel inlet means for internal combustion engines, the same being shown as being applied to an engine of the type known as an L-head engine.

It is a purpose of my invention to provide means for supplying fuel to an engine cylinder with a minimum rise in temperature of the fuel admitted during the period of intake action. This is of very great advantage in increasing the efficiency of the engine, in view of the fact that ordinarily, in engines of the L-head type as now commonly known in the art, the fresh fuel charge is introduced into the cylnder through the combustion chamber space, where it mingles with the residual burned gas therein, being thereby heated to such an extent that it is greatly expanded in volume. As the temperature of the burned gas in the combustion chamber is always relatively high, and particularly so when an engine of this type is operated at or near full power capacity, the rise in temperature of the fuel thus introduced is relatively great, and causes a large percentage increase in volume of the fuel mixture. This causes the fuel mixture filling the space within the cylinder to become less concentrated than would be the case if the same had not been raised in temperature, thus causing the introduction of a smaller amount of fuel in the cylinder than would be the case if the same had not been heated. This is partly offset by the increase in the combined capacity of the cylinder and combustion chamber due to the decrease in volume of the residual burned gas therein due to the cooling effect of the fuel mixture that comes in contact therewith. The net loss of fuel capacity of the cylinder due to the fuel heating by residual gas heat is, however, still a large percentage of the volumetric displacement of the piston, and this loss is reduced to a minimum by my means for introducing fuel into the cylinder.

It is another purpose of my invention, to obtain stratification of fuel in the fuel space within the engine, in order to keep the fuel and the residual burned gas separate during the periods of intake and compression action. Furthermore, it is a purpose of my invention to stratify the fuel over the piston head in such a manner as to obtain piston cooling and economical fuel consumption over the full range of engine operation.

It is still a further object of my invention to provide for mingling of the fuel mixture and the hot residual burned gas during the latter part of the compression stroke to reduce the work necessary for compression of the fuel mixture by utilizing said heat for increasing the compression of the mixture due to the heating action thereof on said fuel mixture during the latter part of the compression stroke of the piston.

Another purpose of the invention is to reduce the heat radiation loss from the engine combustion chamber, this being preferably accomplished by providing a heat insulating air space in the surrounding wall portion at the combustion chamber. The means to accomplish this purpose also preferably constitutes means for absorbing the heat radiated from the combustion chamber wall during combustion and restoring the same to the combustion chamber wall during succeeding cooler periods within the combustion chamber.

It is also a purpose of my invention to provide ignition means associated with the combustion chamber and with the fuel inlet passage, said means preferably comprising multiple ignition means for simultaneously igniting the compressed fuel charge at a plurality of points.

The first of the above mentioned purposes of the invention is preferably accomplished by providing means for dividing the engine combustion space or chamber into two chambers or compartments, one of said chambers being larger than the other and serving as the main combustion chamber and the other serving as an inlet chamber having an opening to the cylinder independent of the opening of the main combustion chamber into said cylinder. The two chambers are preferably so arranged that the same are substantially separated from each other by the piston head, when the same is at the end of the piston stroke. The smaller chamber is preferably in the form of a valve pocket having a fuel inlet valve and comprises an inlet passage leading to the cylinder and adapted to admit and direct fuel into the cylinder in such a manner as to cause it to occupy only the space vacated by the piston during the suction stroke thereof. This arrangement also accomplishes the stratification of the fuel as set forth above.

Other objects and advantages of the invention will appear as the description of the accompanying drawing proceeds. I desire to have it understood, however, that I do not intend to limit myself to the details of construction shown or described, but that I intend to include as part of my invention all such obvious changes and modifications as would occur to a person skilled in this art and as would fall within the scope of the claims.

In the drawing:

Fig. 1 is a fragmentary vertical sectional view of the upper portion of an engine cylinder and associated parts embodying my invention.

Fig. 2 is a section taken on the line 2—2 of Fig. 1.

Fig. 3 is a section taken substantially on the line 3—3 of Fig. 2.

Fig. 4 is a section taken substantially on the line 4—4 of Figs. 1, 2 and 3.

Fig. 5 is a fragmentary sectional view similar to Fig. 2 of a modification and

Fig. 6 is a fragmentary sectional view taken substantially on the line 6—6 of Fig. 5.

Referring in detail to the drawing in Figs. 1 to 4, my improved fuel inlet means is shown as being applied to an engine having a cylinder 10 having a chamber 11 therein, in which the piston 12 operates. The cylinder 10 is provided with a water jacket having the spaces 13 provided therein for the circulation of a cooling medium such as water. Mounted upon the cylinder 10 is a cylinder head 14 having a space 15 therein for the cooling medium.

The cylinder head member 14 is provided with a recessed portion 16 forming a main combustion chamber opening into the cylinder chamber 11, the wall 17 thereof arranged to cover the end of the chamber 11 having a dome shape, to provide a combustion chamber of the most desirable form, for rapid combustion within the same. The combustion chamber 16 has a lateral extension 18 leading to the exhaust passage 19 provided in the cylinder member 10, a valve port 20 being provided at the point where the passage 19 leads from the combustion chamber, with which the valve member 21 cooperates in the usual manner.

The cylinder head member 14 is further provided with a recessed portion 22, shallower and smaller in size than the recess 16 which serves as an inlet chamber connecting with the inlet passage 23 through the valve port 24 having the inlet valve 25 cooperating therewith. The cylinder head member 14 is provided with a partition wall 26 separating the recesses 16 and 22 and having a downwardly curved deflector portion 27.

The recess 22 overlaps the opening in the end of the cylinder 10 in such a manner and the wall portion 27 is so formed, that when the cylinder head is in position on the cylinder a downwardly inclined passage 28 is formed that extends toward the middle of the upper end of the cylinder, to thus direct the fuel mixture entering through the same transversely across the piston head 29, without directing the same toward the mouth of the combustion chamber 16, to thus provide for stratification of the incoming fuel mixture within the cylinder chamber as the piston is moving through its intake stroke.

Extending through the water space 15 is a spark plug socket member 30, substantially surrounded by cooling medium. Screw-threadedly engaging the socket member 30 is the spark plug 31, having its terminal located within the ignition chamber 32, from which the ignition propagation passages 33 and 34 lead respectively to the chambers 22 and 16. An air space 35 is also provided in the head 14, being separated from the water space 15 by the partition walls 37, said air space extending above and around the outer side of the combustion chamber wall 17, to reduce the radiation of heat from said combustion chamber, said air space being shown as being sealed from the outer air by means of the plug 36. The air space 35 being sealed, the increase of the temperature of the air therein will result in an increase in the pressure of said air, said pressure acting on the wall 17 to resist explosion pressure from within the combustion chamber.

In the form of the invention described above, the incoming fuel mixture is separated from the residual burned gas in the combustion chamber 16 as the fuel mixture enters the cylinder through the inlet chamber 22 and the passage 28, entering the cylinder chamber 11 in substantially the direction indicated by the arrows in Fig. 1. The piston is shown as having begun its intake stroke in this figure, with the inlet valve 23 unseated. When the piston commences its compression stroke the fuel mixture and burned gas are stratified, the fuel mixture being located in the cylinder chamber 11 between the piston head and the combustion chamber 16, as well as in the chamber 22 and passage 28, while the burned residual gas is located substantially entirely within the combustion chamber 16. As the piston 12 moves toward the cylinder head during its compression stroke the fuel mixture is compressed as is also the burned gas. As a result the space within the combustion chamber occupied by the burned residual gas is reduced and the fuel mixture enters said combustion chamber from the cylinder chamber 11. The fuel mixture and the burned gas still maintain their stratified relation during this movement of the piston until the piston nears the end of the compression stroke thereof, when due to the movement of the fuel mixture into the combustion chamber 16 a mingling of the burned hot gas and the relatively cool fuel mixture takes place, thus causing a transfer of heat, to the fuel mixture, and greatly increased compression pressure thereof due to tendency of the heat to expand the fuel mixture. When this takes place the piston is near the end of its compression movement, the limit of its movement being shown in Fig. 3, at which time, it cooperates with the lip 27 to almost completely separate the chamber 22 from the chamber 16.

Due to the provision of the air space 35 radiated heat, absorbed by the air therein, from a previous combustion of fuel mixture in the engine is transferred through the wall portion separating the same from the combustion chamber to the fuel mixture within the combustion chamber, thus raising the temperature thereof and reducing the heat losses in the engine, which are a very big item in the thermal efficiency of the engine.

Due to the stratified arrangement of the fuel charge and the burned gas, the fuel charge acts as a cooling medium for the piston head during the intake and compression strokes of the piston and is heated by the hot residual gas contained in the main combustion chamber 16 only during the compression stroke of the piston. Due to the fact that the fuel charge is not heated appreciably during the passage thereof into the cylinder chamber a greater amount of fuel is supplied thereto. Accordingly a combustion chamber larger than in the ordinary construction is provided when the fuel is to be compressed to the pressure normally used in engines of the general type shown, or higher compression pressure than that normally used may be obtained without objectionable reduction of the compression space volume.

One of the important results from the construction described above is, that the fuel mixture is brought into intimate relation with the hot residual burned gas only when it has been nearly fully compressed by the piston. The fuel then being confined under pressure can not expand and the heat then applied to it results in an increase in pressure. The total amount of useful work necessarily absorbed by the piston in compressing the fuel mixture is thus greatly reduced, the engine thereby being made more powerful and more efficient in proportion as the mean effective pressure of the piston compression stroke is reduced.

In Figs. 5 and 6 a modified form of the invention is shown, in which the exhaust valve 21' is shown as being located in the fuel inlet passage formed by the chamber 22' between the inlet valve 25' and the cylinder chamber 11'. The exhaust valve 21' is thus arranged so as to have the incoming fuel mixture pass over the same for the purpose of cooling it. The combustion chamber 16' corresponds to the chamber 16 shown in Figs. 1 to 4 inclusive, and the operation of the device is otherwise substantially as described in connection with Figs. 1 to 4 inclusive.

Having thus described my invention, what I desire to claim and secure by United States Letters Patent is:

1. In an internal combustion engine, a cylinder head, having a combustion chamber, and a valve chamber therein, means on said head for separating said chambers and a single ignition means for substantially simultaneously igniting the contents of both chambers.

2. In an internal combustion engine, a cylinder head, a combustion chamber in said head, an inlet valve chamber in said head, means separating said chambers, an ignition pocket and ignition means therein, said cylinder head having passages leading from said pocket into said combustion and inlet valve chambers.

3. In an internal combustion engine, a cylinder head, a combustion chamber in said head, an inlet valve chamber in said head, means separating said chambers, an ignition pocket, and a spark ignition means therein, said cylinder head having passages leading from said pocket into said combustion and inlet valve chambers.

4. In an internal combustion engine, a cylinder having a chamber therein, a cylinder head having a combustion chamber formed therein, means for exhausting the products of combustion from said combustion chamber, said cylinder head having an inlet valve pocket therein separated from said combustion chamber by a wall portion and overlapping said cylinder chamber and means on said head overlying the cylinder chamber for deflecting the fuel mixture from said inlet valve pocket away from said combustion chamber and toward said cylinder.

5. In an internal combustion engine, a cylinder chamber, a cylinder head having a combustion chamber therein communicating with said cylinder chamber and having an inlet chamber therein, a piston operating in said cylinder chamber, a wall portion between said chambers cooperating with said piston to separate said combustion chamber from said inlet chamber, and spark ignition means in said head between said chambers, said head having fuel and flame passages extending from said ignition means.

6. In an internal combustion engine, a cylinder chamber, a piston operating therein, a cylinder head recessed to provide compression space for said cylinder therein, said space comprising two compartments adapted to receive the contents of said cylinder, one of said compartments being the intake chamber and means for igniting the contents of both of said compartments, comprising a single spark ignition means and a passage provided in said head from said ignition means to each of said compartments.

7. In an internal combustion engine, a cylinder head having a combustion chamber therein, an exhaust valve opening into the same, said cylinder head having an inlet valve pocket therein, a deflecting wall portion adjacent said inlet valve pocket for directing flow of fluid from said inlet valve pocket toward the cylinder with which said head is associated and away from said combustion chamber, and ignition means associated with said deflecting wall portion.

8. A cylinder head having a combustion chamber recess and a valve pocket recess therein, deflecting means on said cylinder head between said recesses, said head having an ignition pocket therein, a spark plug in said ignition pocket and passages leading from said pocket into said recesses.

9. In an internal combustion engine, a cylinder, a cylinder head having a valve recess and a combustion chamber recess therein, a deflecting wall portion on the head over the cylinder adjacent the valve recess separating the recesses and spaced from the cylinder to provide an inlet passage from the valve recess into the cylinder, and ignition means comprising a primary ignition pocket and separate ignition passages in the head leading from said ignition pocket to openings on opposite sides of said deflecting wall portion.

10. In an internal combustion engine, a cylinder, a cylinder head recessed to provide combustion space therein, a low wall portion dividing said combustion space into recesses one on each side of said wall portion, one of said recesses being a valve chamber, said low wall portion extending over said cylinder to provide an inlet passage from said valve chamber into said cylinder and forming means for deflecting incoming fuel toward the cylinder, said cylinder head having ignition means therein comprising a pocket, a spark plug therein, a passage from said valve recess to said pocket and a passage from said pocket to the other of said recesses, said pocket and the passages connected therewith comprising an auxiliary inlet passage for the flow of fuel over said low wall portion from the valve recess to the cylinder.

11. In an internal combustion engine, a cylinder head, a combustion chamber in said cylinder head, a valve chamber in said cylinder head, a depending wall portion on said cylinder head between said chambers and a single means between said chambers for igniting the contents of both of said chambers at separated points on opposite sides of said depending wall portion.

12. A cylinder head having a pair of recesses therein and a wall portion between said recesses, one of said recesses being an inlet chamber and said cylinder head having a passage therein connecting said recesses and extending over said wall portion.

13. In an internal combustion engine, a cylinder, a cylinder head having a pair of recesses therein and a wall portion between said recesses, one of said recesses comprising an inlet chamber, said wall portion being formed to provide means for deflecting incoming fuel toward said cylinder, said cylinder head having a passage therein over said deflecting wall portion connecting said recesses.

14. A cylinder head having a pair of recesses therein and a wall portion between said recesses, one of said recesses being an inlet chamber and said cylinder head having a passage therein connecting said recesses and extending over said wall portion, and ignition means in said passage.

15. In an internal combustion engine, a cylinder, a cylinder head having a combustion chamber recess and a valve pocket recess therein, a low wall portion on said head between said recesses, said head having an ignition pocket therein and having flame passages extending from said ignition pocket, one of said flame passages being directed toward said valve pocket recess, and the other of said passages being directed toward that portion of the cylinder head most remote from said valve pocket recess.

16. The combination with a cylinder, of a cylinder head recessed to provide combustion space therein including a valve chamber, said head having an ignition chamber therein and having ignition outlet passages extending therefrom into said combustion space from said ignition chamber comprising an ignition outlet passage opening into said valve chamber and an ignition outlet passage opening into said combustion space adjacent the axis of said cylinder.

17. The combination with a cylinder, of a cylinder head recessed to provide combustion space therein including a valve chamber, inlet and exhaust valves in said valve chamber, said head having an ignition chamber therein and having ignition outlet passages extending therefrom into said combustion space from said ignition chamber, comprising an ignition outlet passage opening into said valve chamber between said valves, and an ignition outlet passage opening into said combustion space over said cylinder.

In testimony whereof, I hereunto subscribe my name this 10th day of February 1927.

FRANK A. BULLINGTON.